United States Patent [19]

Dobben

[11] Patent Number: 5,894,912
[45] Date of Patent: Apr. 20, 1999

[54] WHEELCHAIR BRAKING DEVICE

[75] Inventor: Steven Dobben, LaPorte, Ind.

[73] Assignee: Steven L. Dobben Trust, LaPorte, Ind.

[21] Appl. No.: 08/838,270

[22] Filed: Apr. 17, 1997

[51] Int. Cl.$^6$ .............. F16P 65/14; A61G 5/00
[52] U.S. Cl. ...................... 188/2 F; 280/242.1
[58] Field of Search .............. 188/2 F; 280/242.1, 280/250.1, 304.1

[56] References Cited

U.S. PATENT DOCUMENTS

| | | | |
|---|---|---|---|
| 2,753,919 | 5/1956 | Sill | 155/30 |
| 3,301,574 | 1/1967 | Good | 280/211 |
| 3,302,757 | 2/1967 | Eagleson, Jr. et al. | 188/167 |
| 3,529,700 | 9/1970 | Marshall | 188/109 |
| 4,320,818 | 3/1982 | Knoche | 188/2 F |
| 4,350,227 | 9/1982 | Knoche | 188/2 F |
| 4,476,964 | 10/1984 | Broman | 188/109 |
| 4,623,043 | 11/1986 | Babilas | 188/2 F |
| 5,203,433 | 4/1993 | Dugas | 188/2 F |
| 5,294,141 | 3/1994 | Mentessi et al. | 280/250.1 |
| 5,358,266 | 10/1994 | Roth et al. | 280/304.1 |

Primary Examiner—Matthew C. Graham
Attorney, Agent, or Firm—Gary M. Hartman; Domenica N.S. Hartman

[57] ABSTRACT

A wheelchair braking device (10) adapted to automatically engage when the wheelchair (12) to which the device (10) is mounted is unoccupied. The braking device (10) includes a support structure (28) to which is pivotably mounted a sensing lever (14) and a braking lever (22). A biasing element (30) is coupled to the braking lever (22) to bias the braking lever (22) in a first rotational direction relative to the support structure (28) and into engagement with a wheel (32) of the wheelchair (12). The sensing and braking levers (14, 22) are interconnected such that the biasing element (30) operates through the braking lever (22) to bias the sensing lever (14) in a second rotational direction relative to the support structure (28), corresponding to a brake engagement position for the sensing lever (14). As such, the interconnection between the sensing and braking levers (14, 22) causes the braking lever (22) to rotate in a direction opposite to the first rotational direction, thereby disengaging the braking lever (22) from the wheel (32), when the sensing lever (14) is caused to rotate in a direction opposite to the second rotational direction, corresponding to a brake disengagement position for the sensing lever (14). The braking device (10) may further include a hand lever (20) that is interconnected with the sensing lever (14), such that the hand lever (20) is operable to pivot the sensing lever (14) from the engagement position to the disengagement position.

20 Claims, 3 Drawing Sheets

WHEELCHAIR BRAKING DEVICE

BACKGROUND OF THE INVENTION

1. Field of the Invention

The present invention generally relates to braking devices for wheelchairs and similar vehicles. More particularly, this invention relates to wheelchair braking device having an uncomplicated construction that can be installed on conventional wheelchairs, and which provides a braking action that automatically disengages when an occupant is seated in the wheelchair.

2. Description of the Prior Art

Wheelchairs are generally equipped with a brake mechanism to enable the user to more safely enter and leave the seat of the wheelchair. Conventional braking mechanisms typically consist of a pair of levers, each engaging the exterior of one of the larger wheels of the wheelchair. To immobilize the wheelchair, the levers must be manually operated to engage the wheels. While such brake mechanisms are reliable, the operator or user of a wheelchair may forget to engage the lever prior to entering or leaving the seat. If the wheelchair is not properly immobilized by the brake, there is a significantly increased risk of the user falling while trying to stabilize him or herself when entering or leaving the wheelchair.

In response, the prior art has suggested various automatic braking systems for wheelchairs. U.S. Pat. Nos. 3,529,700 to Marshall, 4,320,818 to Knoche, 4,623,043 to Babilas, and 5,203,433 to Dugas teach mechanical braking systems that automatically engage when the user rises off the wheelchair seat. Unfortunately, these braking mechanisms are relatively complicated, requiring a complicated mechanical camming system that can be retrofitted to conventional wheelchairs, e.g., Babilas, or requiring considerable modification to the wheelchair itself, e.g., Marshall, Knoche and Dugas. Other braking systems suggested by the prior art have relied on the use of solenoids to engage and disengage a braking lever or pin. For example, U.S. Pat. No. 5,358,266 to Roth et al. discloses a solenoid that operates a bistable braking lever between an engaged and disengaged position, with a large spring acting on the lever to produce the bistable operation. However, the solenoid must be sufficiently powerful to overcome the spring force, such that the solenoid and the battery required to energize the solenoid contribute significantly to the cost of the wheelchair.

From the above, it can be seen that it would be desirable if an automatic braking mechanism were available for wheelchairs, wherein the braking mechanism has a relatively uncomplicated and inexpensive construction, and can be readily mounted to a contentional wheelchair without interfering with the operation of the wheelchair.

SUMMARY OF THE INVENTION

It is an object of this invention to provide a braking mechanism for wheelchairs and similar vehicles.

It is another object of this invention that such a braking mechanism is disengaged whenever a person occupies the wheelchair, and automatically engages when the wheelchair is not occupied.

It is a further object of this invention that the braking mechanism has an uncomplicated construction that can be readily mounted to a wheelchair without necessitating modifications to the wheelchair.

In accordance with a preferred embodiment of this invention, these and other objects and advantages are accomplished as follows.

According to the present invention, there is provided a wheelchair braking device that includes a support structure to which is pivotably mounted a sensing lever and a braking lever. A biasing element is coupled to the braking lever to bias the braking lever in a first rotational direction relative to the support structure. When the braking device is mounted to a wheelchair, the biasing element biases one end of the braking lever toward engagement with a wheel of the wheelchair, thereby inhibiting rotation of the wheel. The sensing and braking levers are interconnected such that the biasing element operates through the braking lever to bias the sensing lever in a second rotational direction relative to the support structure, corresponding to a brake engagement position for the sensing lever. As such, the interconnection between the sensing and braking levers causes the braking lever to rotate in a direction opposite to the first rotational direction, thereby disengaging the braking lever from the wheel, when the sensing lever is caused to rotate in a direction opposite to the second rotational direction, corresponding to a brake disengagement position for the sensing lever. The braking device may further include a hand lever that is interconnected with the sensing lever, such that the hand lever is operable to pivot the sensing lever from the engagement position to the disengagement position. Consequently, the braking lever can be disengaged from the wheel by operation of the hand lever.

The wheelchair braking device of this invention is adapted to be installed on a wheelchair by securing the support structure to the frame of the wheelchair. The sensing lever is pivotably mounted to the support structure such that one end of the sensing lever contacts the underside of the wheelchair seat, which is typically a pliable sheet-like material. Consequently, the sensing lever is caused to be rotated downwardly into the disengagement position when the seat is occupied, but otherwise is free to be rotated upwardly by the biasing element into the engagement position when the seat is unoccupied. As a result, the biasing member causes the braking lever to engage the wheel when the wheelchair seat is unoccupied, and the braking lever disengages the wheel when, by overcoming the biasing element, the sensing lever is rotated toward the disengagement position, corresponding to the wheelchair seat being occupied. If present, the hand lever is mounted to a handle of the wheel chair and is interconnected with the sensing lever as described above, therefore enabling disengagement of the braking levers with the wheels by one desiring to push the wheelchair when unoccupied.

To fully immobilize the wheelchair, two braking devices in accordance with this invention are preferably installed on the wheelchair, with each braking mechanism being dedicated to brake one of the large wheels of the wheelchair. From the above description, it can be appreciated that the automatic braking capability of the braking device is achieved with minimal additional hardware, and does not require physical modification of the existing wheelchair structure. As such, the braking device of this invention offers a relatively inexpensive accessory that can be readily retrofitted to most existing wheelchairs.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawings, in which.

DETAILED DESCRIPTION OF THE PREFERRED EMBODIMENT

Figure 1:
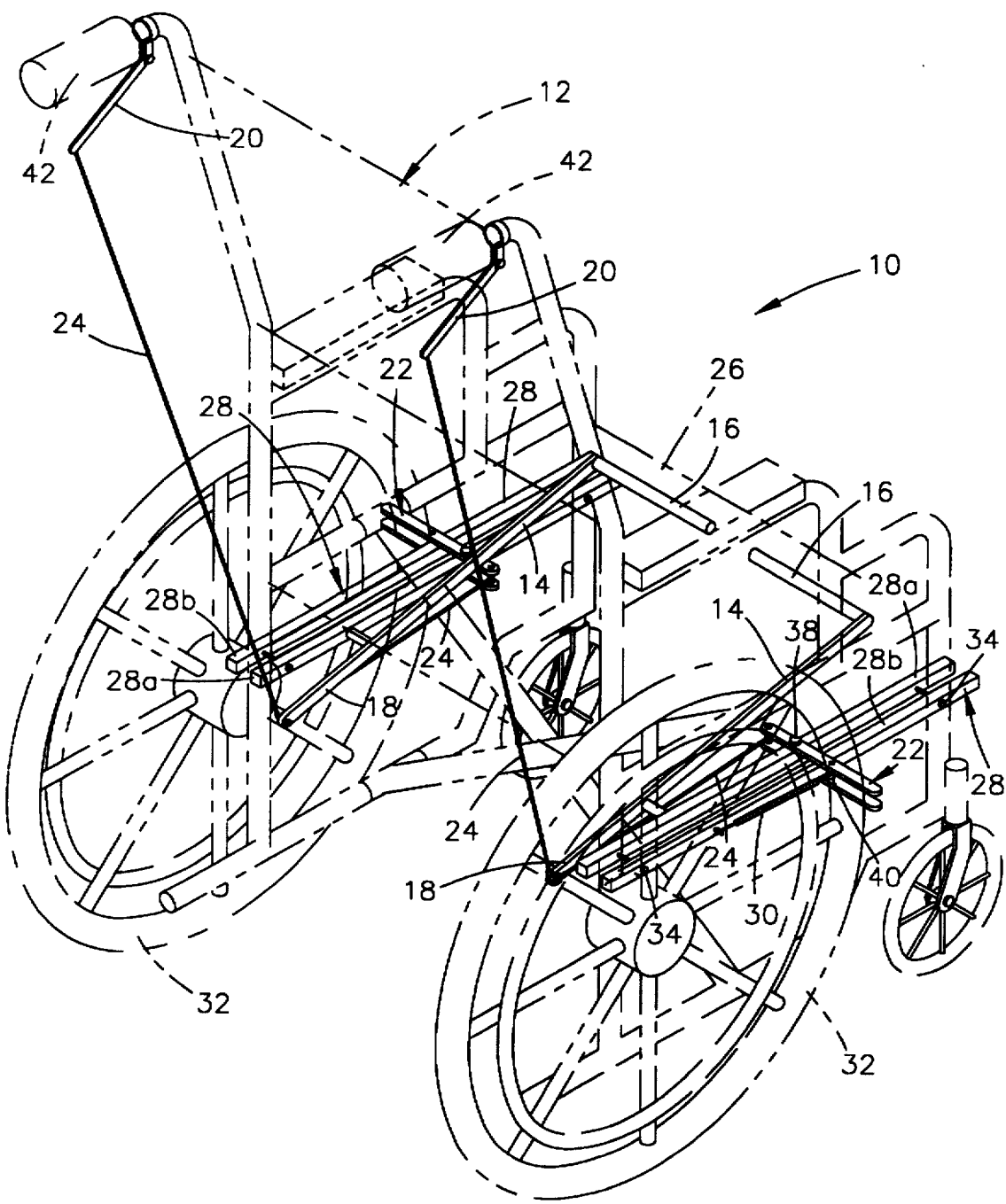
FIG. 1 shows a wheelchair braking device in accordance with a preferred embodiment of this invention, shown mounted on a wheelchair (in phantom)
Figure 2:
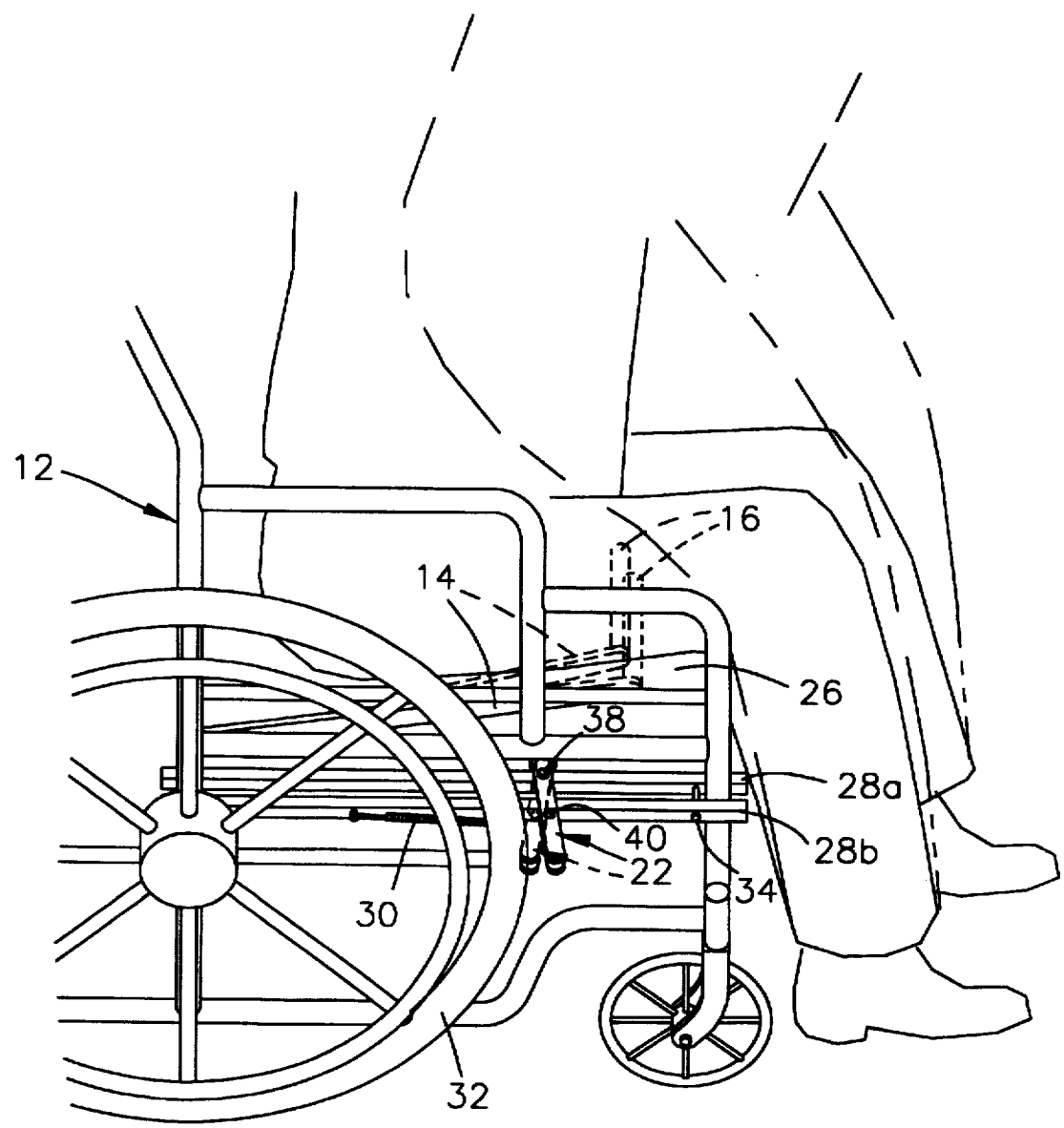
FIG. 2 illustrates the operation of the braking device of FIG. 1 in accordance with this invention.
Figure 3:
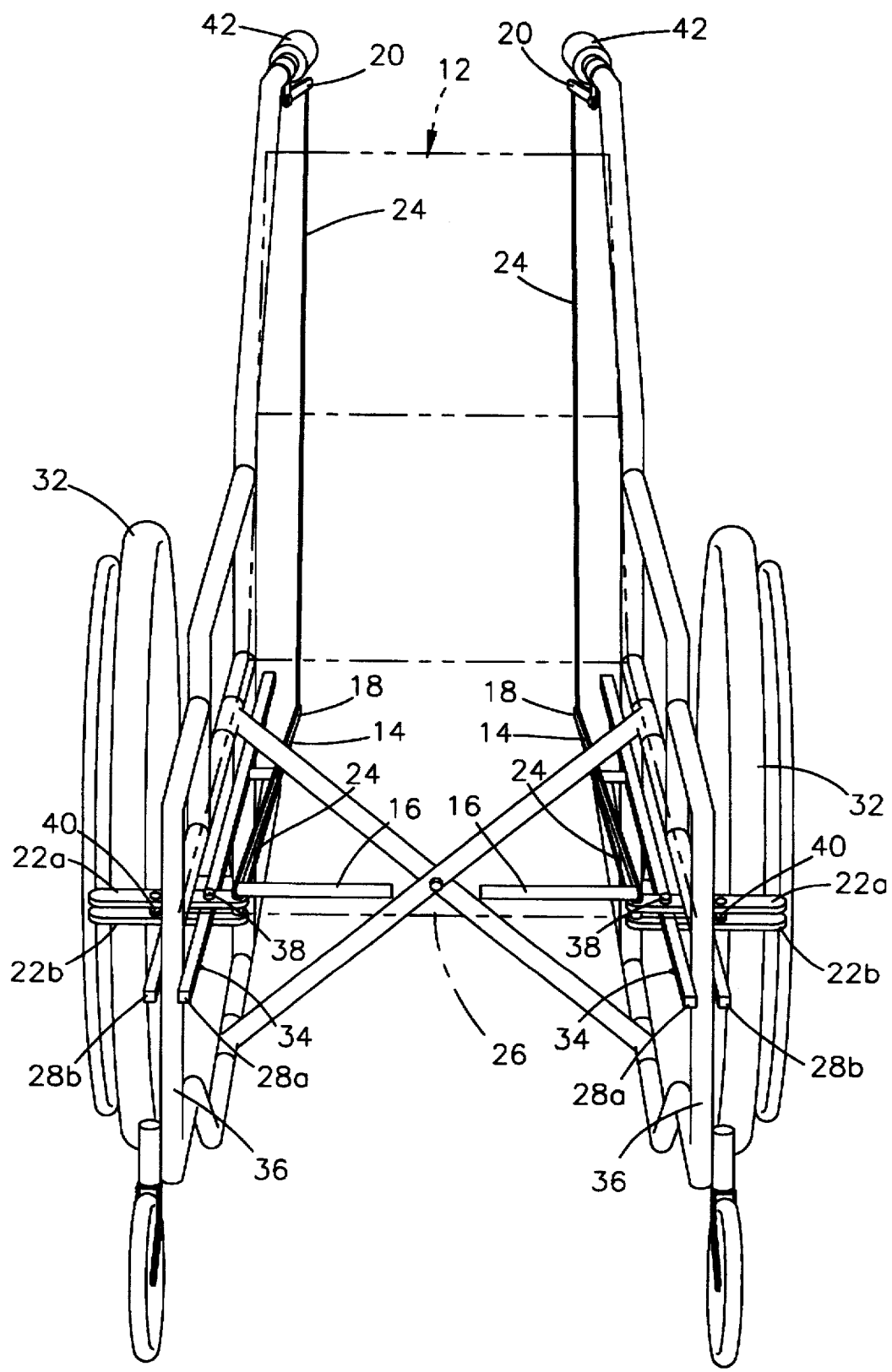
FIG. 3 shows the braking device of FIG. 1 mounted to the wheelchair in a collapsed condition.

A wheelchair braking device 10 in accordance with a preferred embodiment of this invention is illustrated in FIGS. 1 through 3. As shown in FIG. 1, the braking device 10 is mounted to a conventional wheelchair 12, the wheelchair 12 being shown in phantom to render the construction of the braking device 10 more clear in the Figure. Advantageously, the structures and components of the wheelchair 12 need not be modified or removed to accommodate the braking device 10, and the braking device 10 is configured to be mountable to essentially any conventional wheelchair, including those designed to be collapsible, as shown in FIG. 3.

The braking device 10 is illustrated as including two separate units, one on each side of the wheelchair 12 to operate on one of the two larger wheels 32 of the wheelchair 12. Each unit includes a support structure 28, composed of two beams 28a and 28b oriented side by side in a fore-aft (longitudinal) direction of the wheelchair 12. While shown as having a rectangular tubular cross-section, the beams 28a and 28b could be configured differently from that shown. As more readily apparent from FIG. 3, the beams 28a and 28b are secured to vertical frame members 36 of the wheelchair 12 with fasteners 34 that essentially clamp the beams 28a and 28b to opposite sides of the frame members 36. While bolts and nuts are shown for the fasteners 34, a wide variety of fastening devices and techniques could be used to secure the beams 28a and 28b. In addition, while the installation technique shown in FIG. 3 is preferred to avoid drilling, welding or otherwise modifying the wheelchair 12 to attach the support structure 28, it is foreseeable that one could permanently fasten the beams 28a and 28b directly to the frame members 36 or other parts of the wheelchair 12 if so desired.

With reference again to FIG. 1, each unit of the braking device 10 is shown as further including a sensing lever 14 and a braking lever 22. The sensing levers 14 are shown as being pivotably mounted near a rearward end of the support structure 28, while the braking levers 22 are shown as being pivotably mounted nearer a forward end of the support structures 28. Each sensing lever 14 is mounted to pivot about a horizontal axis oriented in a lateral direction relative to the wheelchair 12. A forward end of each sensing lever 14 is equipped with a horizontal bar 16 so as to be positioned directly beneath the seat 26 of the wheelchair 12 and adjacent the braking levers 22. Consequently, if contact is maintained with the underside of the seat 26, the bars 16 of the sensing levers 14 are raised and lowered along with the seat 26. Because of the pliable nature of the seat 26 and the manner in which the bars 16 are urged into contact with the seat 26, as will be explained below, this relationship causes the bars 16 to be rotated into a raised "engaged" position if the seat 26 is not occupied (as shown in FIGS. 1 and 3), and rotated into a lowered "disengaged" position if the seat 26 is occupied (as shown in FIG. 2).

When the sensing levers 14 are in their engaged positions, the rearward end 18 of each sensing lever 14 is generally oriented in a downward position, as shown in FIG. 1. A chain 24 serves to interconnect the rearward end 18 of each sensing lever 14 with an inboard end of each braking lever 22. The braking levers 22 are each shown as being composed of two plates 22a and 22b that are oppositely-disposed at the upper and lower surfaces of the beams 28a and 28b. While this construction is preferred for stability, it is foreseeable that a single plate could serve to form each braking lever 22, and that numerous other configurations for the braking levers 22 could be employed. From the Figures, it can be seen that the braking levers 22 pivot about a vertical axis relative to the wheelchair 12, and that outboard ends of the braking levers 22 are adapted to engage the wheels 32 of the wheelchair 12. As shown, the braking levers 22 are pivotably secured to their corresponding inboard beam 28a with a pin 38, with the outboard ends of the plates 22a and 22b being secured together with a post 40 or other suitable component therebetween to space the plates 22a and 22b apart. A coil spring 30 is shown as being secured to each post 40 for urging the outboard end of each braking lever 22 rearward and into engagement with its wheel 32. To maintain a modular construction for the device 10, the springs 30 are preferably attached to the outboard beams 28b as shown in FIGS. 1 and 2, though it is foreseeable that the springs 30 could be secured directly to the wheelchair 12. Furthermore, it is foreseeable that another suitable biasing elements could be substituted for the springs 30.

With the above arrangement, the chains 24 interconnect the rearward ends 18 of the sensing levers 14 with the inboard ends of the braking levers 22. As a result, the chains 24 pull rearwardly on the inboard ends of the braking levers 22, disengaging the outboard ends of the braking levers 22 from the wheels 32, when the bars 16 of the sensing levers 14 are rotated downwardly into the disengaged position. This situation is illustrated in FIG. 2, in which the seat 26 of the wheelchair 12 is occupied. Conversely, if the bars 16 of the sensing levers 14 are allowed to rotate upwardly into the engaged position, corresponding to the seat 26 being unoccupied, the rearward ends 18 of the sensing levers 14 rotate forward toward the braking levers 22, allowing the springs 30 to rotate the outboard ends of the braking levers 22 rearwardly and engage the wheels 32. This situation is illustrated in phantom in FIG. 2, in which the user has raised himself or herself off the seat 26 of the wheelchair 12.

As shown in FIG. 1, the braking device 10 of this invention preferably includes a pair of hand levers 20 that enable the braking levers 22 to be disengaged with their wheels 32. Each hand lever 20 is mounted to a handle 42 of the wheelchair 12 and interconnected with one of the rearward ends 18 of the sensing levers 14, as by forming the chain 24 to be continuous from the inboard ends of the braking levers 22, to the rearward ends 18 of the sensing levers 14, and then to the rearward ends of the hand levers 20. With this configuration, upward movement of the hand levers 20 rotates the rearward ends 18 of the sensing levers 14 upward, causing the chains 24 to pull rearwardly on the inboard ends of the braking levers 22, thus disengaging the braking levers 22 with their wheels 32.

From the above, the efficient and uncomplicated operation of the braking device 10 of this invention can be readily appreciated. Whenever the wheelchair 12 is occupied, the seat 26 is urged downward and the sensing levers 14 are rotated into their disengaged positions, overcoming the biasing action of the springs 30 that would otherwise cause the braking levers 22 to engage the wheels 32. As the occupant rises from the seat 26, the sensing levers 14 are allowed to rise with the seat 26 under the influence of the springs 30 operating through their respective braking levers 22, which in turn are caused to engage the wheels 32. In addition to its uncomplicated operation, the braking device 10 can also be seen to have an uncomplicated construction, which promotes the ease with which the braking device 10 of this invention can be installed on essentially any conventional wheelchair. As an example, FIG. 3 illustrates the compatibility of the braking device 10 with a collapsible wheelchair 12. As the wheelchair 12 is collapsed, each unit of the braking device 10 remains secured to the frame members 36 of the wheelchair 12. The configuration of the bars 16 of the sensing levers 14 allow the wheelchair 12 to be collapsed without the bars 16 interfering with each other or the structure of the wheelchair 12. In addition, the narrow profiles of the structural supports 28 enable the wheelchair 12 to be completely collapsed.

While the invention has been described in terms of a preferred embodiment, it is apparent that other forms could be adopted by one skilled in the art. For example, other elements could be substituted for the chains 24, such as cords, cables and wires, and for the springs 30, such as elastic members and spring designs other than tension coil springs. In addition, the shapes and relative orientations of the sensing and braking levers 14 and 22 could be other than that shown, and the braking device 10 could be adapted to mount to wheelchairs that differ from that shown in the Figures. Accordingly, the scope of the invention is to be limited only by the following claims.

What is claimed is:

1. A wheelchair braking device comprising:
    a rigid support structure;
    a sensing lever pivotably mounted to the support structure;
    a braking lever pivotably mounted to the support structure;
    means coupled to the braking lever for biasing the braking lever in a first rotational direction relative to the support structure;
    means for interconnecting the sensing lever and the braking lever, the interconnecting means causing the biasing means to bias the sensing lever in a second rotational direction relative to the support structure, the interconnecting means causing the braking lever to rotate in a direction opposite to the first rotational direction when the sensing lever is caused to rotate in a direction opposite to the second rotational direction.

2. A wheelchair braking device as recited in claim 1, wherein the support structure is a beam, the sensing lever being pivotably mounted near a first end of the beam, the braking lever being pivotably mounted near a second end of the beam opposite the first end.

3. A wheelchair braking device as recited in claim 1, wherein the sensing lever is pivotably mounted to the support structure between oppositely-disposed first and second ends of the sensing lever, the first end of the sensing lever being closer to the braking lever than the second end of the sensing lever, the sensing lever being adapted to rotate between a disengaged position and an engaged position, the first and second ends of the sensing lever being closer to the support structure in the disengaged position than in the engaged position.

4. A wheelchair braking device as recited in claim 3, wherein the interconnecting means is attached to the second end of the sensing lever.

5. A wheelchair braking device as recited in claim 4, further comprising a hand lever interconnected with the second end of the sensing lever, the hand lever being operable to pivot the sensing lever from the engaged position to the disengaged position.

6. A wheelchair braking device as recited in claim 1, wherein the braking lever is pivotably mounted to the support structure between oppositely-disposed first and second ends of the braking lever.

7. A wheelchair braking device as recited in claim 6, wherein the biasing means is coupled to the support structure and to the braking lever near the first end of the braking lever, and wherein the interconnecting means is attached to the braking lever near the second end of the braking lever.

8. A wheelchair braking device as recited in claim 7, wherein the sensing lever is pivotably mounted to the support structure between oppositely-disposed first and second ends of the sensing lever, the first end of the sensing lever being closer to the braking lever than the second end of the sensing lever, the sensing lever being adapted to rotate between a disengaged position and an engaged position, the first and second ends of the sensing lever being closer to the support structure in the disengaged position than in the engaged position.

9. A wheelchair braking device as recited in claim 8, wherein the interconnecting means is attached to the second end of the sensing lever.

10. A wheelchair braking device as recited in claim 9, further comprising a hand lever interconnected with the second end of the sensing lever, the hand lever being operable to pivot the sensing lever from the engaged position to the disengaged position.

11. A wheelchair braking device as recited in claim 1, further comprising a hand lever interconnected with the sensing lever, the hand lever being operable to pivot the sensing lever so as to cause the interconnecting means to pivot the braking lever in the direction opposite to the first rotational direction.

12. A wheelchair braking device as recited in claim 1, wherein the wheelchair braking device is installed on a wheelchair comprising a frame, wheels rotatably mounted to the frame, a seat supported on the frame, and handles attached to the frame, and wherein:
    the support structure is secured to the frame of the wheelchair;
    the sensing lever is pivotably mounted to the support structure between oppositely-disposed first and second ends of the sensing lever, the sensing lever being adapted to rotate between an engaged position and a disengaged position, the first end of the sensing lever contacting the seat of the wheelchair;
    the braking lever is pivotably mounted to the support structure between oppositely-disposed first and second ends of the braking lever;
    the interconnecting means is attached to the sensing lever near the second end thereof and to the braking lever near the second end thereof;
    the biasing means is coupled to the braking lever near the first end thereof and biases the first end of the braking lever toward engagement with the wheel of the wheelchair, the first end of the braking lever engaging the wheel when the sensing lever is rotated toward the engaged position, the first end of the braking lever disengaging the wheel when the sensing lever is rotated toward the disengaged position; and
    the wheelchair braking device further comprises:
        a hand lever mounted to one of the handles of the wheelchair; and
        second means for interconnecting the second end of the sensing lever with the hand lever, the hand lever being operable to pivot the sensing lever from the engaged position to the disengaged position.

13. A wheelchair braking apparatus comprising a pair of braking devices, each braking device comprising:
- a support structure comprising an elongate beam having a longitudinal axis, a vertical axis perpendicular to the longitudinal axis, and a horizontal axis perpendicular to the longitudinal and vertical axes;
- a sensing lever mounted to the beam so as to pivot about the horizontal axis thereof, the sensing lever having a first end and an oppositely-disposed second end, the horizontal axis being between the first and second ends of the sensing lever;
- a braking lever mounted to the beam so as to pivot about the vertical axis thereof, the braking lever having a first end and an oppositely-disposed second end, the vertical axis being between the first and second ends of the braking lever;
- means coupled to the beam and to the first end of the braking lever for biasing the braking lever in a first rotational direction about the vertical axis of the beam;
- means for interconnecting the second end of the sensing lever with the second end of the braking lever, the interconnecting means causing the biasing means to bias the sensing lever in a second rotational direction about the horizontal axis of the beam, the interconnecting means causing the braking lever to rotate in a direction opposite to the first rotational direction when the sensing lever is caused to rotate in a direction opposite to the second rotational direction.

14. A wheelchair braking apparatus as recited in claim 13, wherein the sensing lever is pivotably mounted near a first end of the beam and the braking lever is pivotably mounted near a second end of the beam opposite the first end thereof.

15. A wheelchair braking apparatus as recited in claim 13, wherein the sensing lever is adapted to rotate between a disengaged position and an engaged position, the first and second ends of the sensing lever being closer to the beam in the disengaged position than in the engaged position.

16. A wheelchair braking apparatus as recited in claim 15, further comprising a hand lever interconnected with the second end of the sensing lever, the hand lever being operable to pivot the sensing lever from the engaged position to the disengaged position.

17. A wheelchair braking apparatus as recited in claim 13, further comprising a hand lever interconnected with the sensing lever, the hand lever being operable to pivot the sensing lever in the direction opposite to the second rotational direction so as to cause the interconnecting means to pivot the braking lever in the direction opposite to the first rotational direction.

18. A wheelchair braking apparatus as recited in claim 13, wherein the beam is a first beam of the support structure, the support structure further comprising:
- a second beam that is substantially parallel to the first beam; and
- means for securing the first and second beams together and generating a clamping force therebetween.

19. A wheelchair braking apparatus as recited in claim 13, wherein the braking lever is a first braking lever, each braking device further comprising a second braking lever that is coupled and substantially parallel to the first braking lever, the beam being disposed between the first and second braking levers.

20. A wheelchair braking apparatus as recited in claim 13, wherein the wheelchair braking apparatus is installed on a wheelchair comprising a frame, wheels rotatably mounted to the frame, a seat supported on the frame, and handles attached to the frame, and wherein for each braking device:
- the support structure is secured to the frame of the wheelchair;
- the sensing lever is adapted to rotate between an engaged position and a substantially horizontal disengaged position, the first end of the sensing lever contacting the seat of the wheelchair, the first end of the sensing lever being closer to the braking lever than the second end of the sensing lever;
- the biasing means biases the first end of the braking lever toward engagement with the wheel of the wheelchair, the first end of the braking lever engaging the wheel when the sensing lever is rotated toward the engaged position, the first end of the braking lever disengaging the wheel when the sensing lever is rotated toward the disengaged position; and
- at least one of the braking devices further comprises:
  - a hand lever mounted to one of the handles of the wheel chair; and
  - second means for interconnecting the second end of the sensing lever with the hand lever, the hand lever being operable to pivot the sensing lever from the engaged position to the disengaged position.

* * * * *